Inventor
SAMUEL HORELICK

INVENTOR
SAMUEL HORELICK

United States Patent Office 2,817,065
Patented Dec. 17, 1957

2,817,065

ELECTRICAL TRANSFORMER WINDINGS

Samuel Horelick, Pittsburgh, Pa., assignor, by mesne assignments, to McGraw Electric Company, a corporation of Delaware Original application July 23, 1947, Serial No. 763,082. Divided and this application March 16, 1953, Serial No. 348,179

9 Claims. (Cl. 336—58)

This invention relates to electrical transformer windings and, in particular, to high-voltage windings for power transformers and the manufacture thereof.

The high-voltage windings of power transformers are usually of either the pancake or helical type. Immersion of such windings in oil or other insulating liquid is usually the best method of insulating against the high voltages for which power transformers are designed. High-voltage windings of the type mentioned, however, as constructed heretofore, have lacked the mechanical strength to resist distortion caused by electromagnetic forces resulting from short-circuit, despite the fact that they are usually clamped under pressure between end plates. To impart the necessary strength and rigidity to the windings, it has been customary to dip them in varnish. This treatment, however, is not free from objections. The varnish being oil-proof prevents the insulating oil from penetrating through the insulation surrounding each turn of wire. There is also the danger of trapping air in the turn insulation so that it cannot be removed but remains as a weak point in the insulation and a possible cause of breakdown of the insulation.

I have invented a novel transformer winding which overcomes the aforementioned objections. The present application is a division of my copending application, Serial No. 763,082, filed July 23, 1947, now U. S. Patent No. 2,654,142, covering the method of constructing my novel transformer winding. My improved winding has the turns of each coil bonded together and adjacent coils bonded to each other by radial spacers coated with a heat-reactive compound such as shellac, to form an integral mass strong enough to resist short-circuit stresses without the necessity of dipping in varnish. In making the improved winding, if it is of the pancake type, I assemble the coils with shellac-coated spacers therebetween. In the case of a helical winding, I insert the spacers between turns. I then apply pressure axially of the completed winding and subject it to heat while maintaining pressure thereon, thus curing or polymerizing the shellac after an initial softening thereof, and permanently staying the several coils of a pancake winding or the coil turns of a helical winding by bonding them firmly to the spacers. The resulting adhesion gives the winding the mechanical strength necessary to withstand short circuits safely and, at the same time, leaves the turns largely exposed to the oil for easy penetration thereby of the turn insulation, free of the oil-proofing effect of the varnish coating which has been applied previously.

A complete understanding of the invention may be obtained from the following detailed description and explanation which refer to the accompanying drawings illustrating the present preferred embodiment and practice. In the drawings, Figure 1 is an elevation partly in section showing a winding assembled from a plurality of pancake coils and spacers, compressed between end plates;

Figure 1:
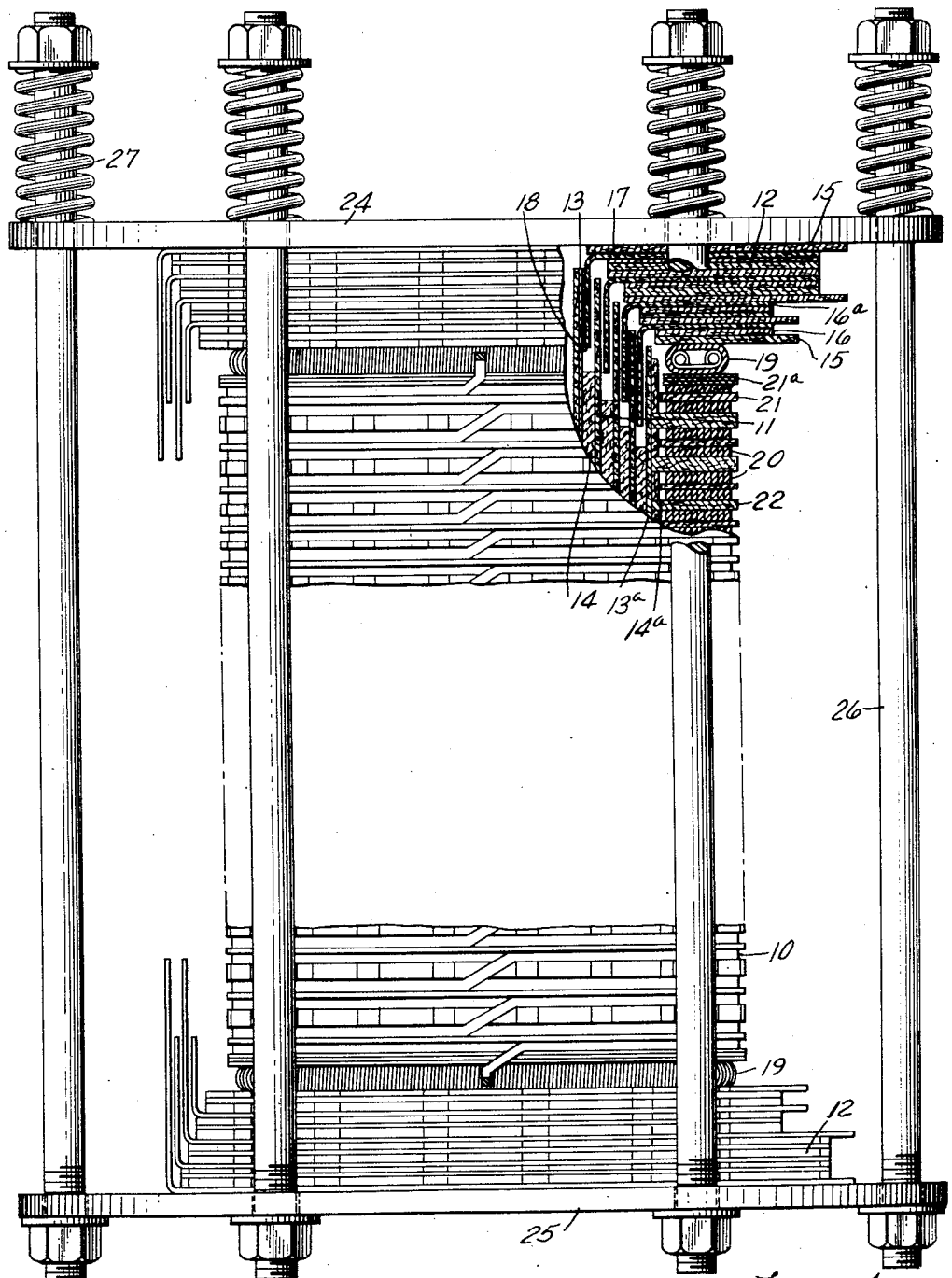
Figure 2:
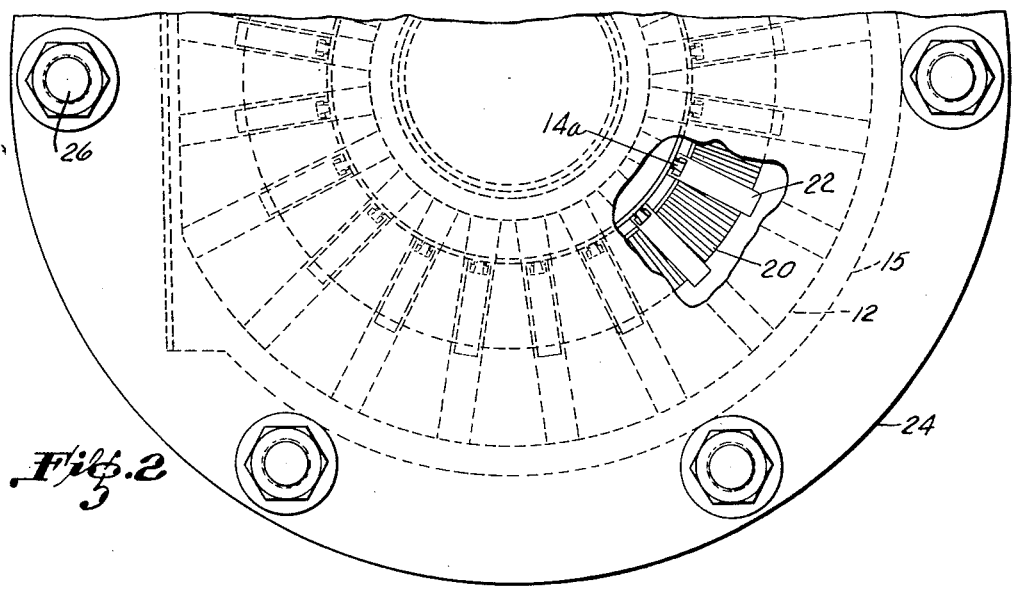
Figure 2 is a partial plan view thereof partly broken away.
Figure 3:
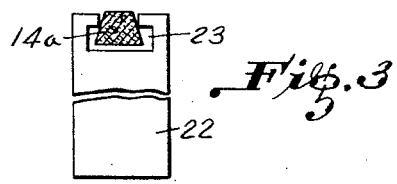
Figure 3 is a partial horizontal section to enlarged scale showing the connection between the radial spacers and vertical spacers.

Referring in detail to the drawings and, for the present, to Figures 1 through 3, a high-voltage transformer winding of the pancake type indicated generally at 10 is built up on a composite cylindrical insulation barrier 11 having flanges and end rings 12. In the completed transformer the low-voltage windings (not shown) are disposed within the barrier 11 and one leg of the laminated core extends through them. The barrier 11 is composed of alternating, laminated tubes 13 and spacer strips 14 spaced circumferentially thereof. The tubes are preferably of laminated paper and the spacer strips of pressboard. The flanges or end rings 12 are composed of washers 15 and radial spacers 16 and 16a spaced circumferentially thereof. Angle collars 17 have horizontal flanges disposed between the washers and cylindrical necks 18 fitting down into the tubes 13. The washers 15, spacers 16 and 16a and angle collars 17 are of pressboard. Static shield rings 19 are disposed between the flanges 12 and the winding 10.

The complete high-voltage winding 10 is assembled in the known manner from pancake coils 20, washers 15 and collars 17, spacers 16 and 16a, tubes 13 and spacer strips 14. Vertical spacer strips 14a are placed in circumferentially spaced relation about the outermost tube 13a. These spacer strips are of dovetail shape as shown in Figure 3 and are applied to the tube 13a with their narrower side innermost. They may conveniently be secured to the tube temporarily by any convenient means.

Pressboard washers 21 are disposed between the pancake coils 20 of each pair. Similar washers 21a are disposed between the top and bottom coils and the static shield rings. Between each successive pair of coils 20 I insert radial spacers 22 of pressboard, in circumferentially spaced relation as shown in Figure 2. The spacers 22 are notched at their inner end as indicated at 23 for anchorage to the vertical spacer strips 14a.

The washers 21 and the spacers 22 have their top and bottom surfaces coated with a layer of heat-reactive material such as shellac or other material which softens and becomes tacky when first heated and is then polymerized or cured and converted permanently so that it retains the solid state even on subsequent heating. Numerous synthetic resins have this property as well as natural shellac. These compounds are preferably applied to the washers and spacers by dissolving them in a volatile solvent and brushing or spraying the solution on the surfaces of these parts. After drying, the parts have a thin film of solid shellac or other compound on the surfaces thereof which are engaged by the turns of the coils 20 when the winding 10 is assembled.

When the winding 10 has been completely assembled on the barrier 11 with the flanges 12, I clamp the entire assembly between end plates 24 and 25. The end plates may be drawn together by through bolts 26. Compression springs 27 are disposed under the nuts at one end of the bolts and the nuts are turned down sufficiently to compress the springs so that if the winding shrinks during subsequent processing to be described shortly, the springs will expand and continuously maintain a certain degree of pressure on the winding.

When the winding has been clamped between the end plates, I subject it to heating for several hours at a moderate temperature sufficient to drive off any moisture and to polymerize or cure the film or layer of shellac or other similar material on the surfaces of the washers 21 and spacers 22 in contact with the top and bottom faces of the coils 20. As the winding is heated to the curing temperature of the shellac coating on the washers and spacers, the shellac first softens and becomes tacky. As polymerization proceeds, the material cures or sets permanently in the form of a solid which thereafter remains substantially rigid. By maintaining the coils in contact with the washers and spacers under pressure throughout the heating period, I thus obtain a firm bond between them as the shellac is cured after which the washers and spacers serve to stay the turns of the coils. In fact, the entire winding 10 becomes a more or less integral mass after being heated. The radial spaces between the spacers 22 provide passages for insulating oil to flow radially through the winding and afford free access thereof to substantially all portions of the coils 20 when the completed winding is assembled with the low-voltage windings and core and immersed in the usual tank filled with oil. The oil thus readily penetrates the paper wrapping on the turns of the coils 20 and fills all the spaces between turns and between adjacent coils, eliminating any air pockets which would constitute a weak point in the transformer insulation.

As previously pointed out, the springs 27 cause the end plates 24 and 25 to continue to apply pressure to the winding even after the shrinkage thereof incident to drying. After the winding has been heated for a period sufficient to dry it thoroughly and cure the shellac coating on the washers and spacers, the end plates are removed and the high-voltage winding is then ready for assembly with the low-voltage windings and core. The windings are secured to the core in the usual manner and the usual clamping bars applied across the ends of the windings and connected together by tie rods in the customary way.

Figure 4:
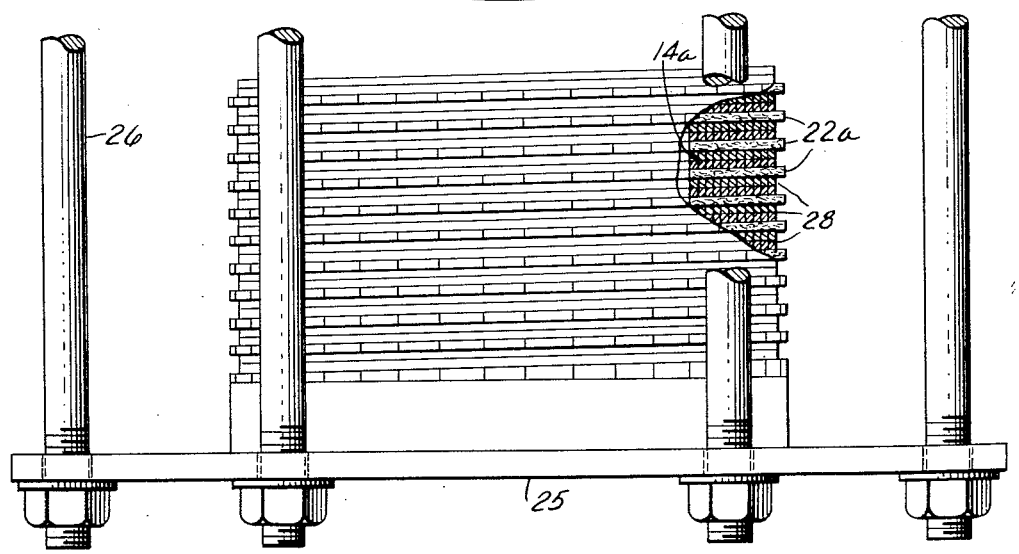
Figure 4 is a partial elevation similar to Figure 1 showing the invention applied to a helical winding.

Figure 4 shows a winding 28 similar to that shown at 10 except that, instead of being composed of stacked pancake coils 20, it is formed by winding a plurality of conductors disposed side-by-side in a continuous helix. The turns of the helix are maintained in spaced relation by spacers 22a similar to the spacers 22 and strung on spacer strips 14a in the same manner as the latter. The winding 28 does not include any washers 21 since the turns are helical instead of being of flat, pancake shape. The spacers 22a are coated with shellac or similar compound in the manner already explained and the winding 28 is processed in the same way as the winding 10.

It will be apparent from the foregoing that the invention provides a transformer winding having important advantages over the high-voltage transformer windings made by the method known previously. In the first place, a winding according to my invention is insulated by the maximum dielectric value of the medium employed, i. e., oil, since air pockets are avoided and free access for the oil is afforded to all portions of the winding. Secondly, the bonding of the winding turns to the radical spacers and washers, if used, serves to stay the turns and maintain them rigidly in proper relative position under the stress resulting from short-circuit, thus avoiding distortion and possible breakdown. In addition, the cost of the varnish treatment used heretofore, which is substantial, is avoided. The cost of coating the washers and spacers with shellac or similar compound is materially less than the cost of the varnish treatment.

Although I have illustrated and described but a preferred embodiment and practice with a modification, it will be recognized that changes in the details of the procedure and construction disclosed may be made without departing from the spirit of the invention or the scope of the appended claims.

I claim:

1. In oil-filled electrical induction apparatus, in combination, an insulating cylinder, a plurality of coaxial helical turns surrounding said cylinder wound from rectangular conductor strands disposed in side-by-side relation and having insulation permeable to the oil filling said apparatus, a plurality of axially extending spacers between said cylinder and said turns, a plurality of equally circumferentially separated turn spacers attached respectively to said axial spacers and extending radially outward from said cylinder between said turns and permitting access of said transformer oil to the permeable insulation covering all of said conductor strands, said turns being held rigidly together as a unitary assembly and said conductor strands being bonded to said radial spacers by a fully cured and polymerized heat reactive compound.

2. A winding for an oil-filled transformer comprising a plurality of coaxial, axially spaced, coil sections each comprising convolutions of conductor of rectangular cross section in side-by-side relation and having solid insulation permeable to the oil filling said transformer, insulating members extending radially between said coil sections, certain of said insulating members being radial spacers circumferentially spaced from each other permitting access of transformer oil to the permeable insulation covering said convolutions, said coil sections being held rigidly together as a unitary assembly, and said convolutions being stayed by a polymeric heat reactive compound bonding said conductor convolutions to said insulating members.

3. An electrical winding for an oil-filled transformer comprising a plurality of coaxial disk type coils each having a plurality of conductor turns in side-by-side relationship and having solid insulation permeable to the oil filling said transformer, annular insulating washers between certain of said coils, radial spacers circumferentially spaced from each other between certain others of said coils permitting access of oil to the permeable insulation covering all of said conductor turns, said coils being rigidly held together as a unitary assembly and said conductor turns being stayed in their relative positions by a polymeric heat reactive compound bonding said conductor turns to said washers and said radial spacers, said oil surrounding said winding and penetrating said permeable insulation and replacing any air within said insulation.

4. An electrical winding in accordance with claim 3 wherein said coils are arranged in pairs, said annular washers are between the coils of each pair, and said radial spacers are between said pairs.

5. An oil-filled electrical induction apparatus including a cylindrical insulation barrier, a plurality of pairs of stacked disk coils surrounding said barrier and radially spaced from said barrier to form an annular cylindrical passageway between said barrier and said stack of coils, each of said coils including conductor turns in side-by-side relationship and having solid insulation permeable to the oil filling said apparatus, a plurality of axial spacers extending in a direction parallel to the longitudinal axis of said barrier and circumferentially spaced from each other in said passageway, a plurality of relatively rigid radial insulating spacers circumferentially spaced from each between each of said pairs permitting access of oil to the permeable insulation covering all of said conductor turns, said radial spacers being attached to said axial spacers, an annular insulating washer between the coils of each pair, said coils being rigidly held together as a unitary assembly and said turns being stayed and rigidly held in their relative positions by a polymeric heat reactive compound bonding the conductor turns to said radial spacers and to said annular washers.

6. The combination in an electrical winding for oil-filled induction apparatus of a plurality of conductor turns of rectangular cross section having solid insulation permeable to the oil filling said apparatus, said conductor turns being in side-by-side relation and arranged in axially spaced apart layers, the inside diameter of all of said layers being approximately equal and the outside diameter of all of said layers being approximately equal, insulating members extending between said layers certain of which are equiangularly spaced, radially extending, relatively rigid insulating spacers affording access of said oil to the permeable insulation covering all of said conductor turns, and retaining means for said spacers, said layers being rigidly held together as a unitary assembly and said conductor turns being stayed in their relative positions by a polymeric heat reactive compound bonding said conductor turns to said insulating members.

7. An oil-filled electrical apparatus including a cylindrical insulation barrier, a plurality of conductor turns in side-by-side relation surrounding said barrier and arranged in axially spaced apart layers, said turns being radially spaced from said barrier to form an annular cylindrical passageway therebetween and having insulation permeable to the oil filling said apparatus, a plurality of axial spacers extending in a direction parallel to the longitudinal axis of said barrier and circumferentially spaced from each other in said passageway, insulating members extending radially between said layers including a plurality of radial spacers circumferentially spaced from each other between certain of said layers permitting access of oil to the permeable insulation covering all of said turns, said radial spacers being attached to said axial spacers, said layers being held rigidly together as a unitary assembly and said turns being stayed in their relative positions by a polymeric heat reactive compound bonding said turns to said insulating members, said oil surrounding said layers and penetrating said permeable insulation and replacing any air within said insulation.

8. An electrical induction apparatus including a magnetic core having a winding leg, a first electric winding surrounding said winding leg, a plurality of coaxial insulating tubes surrounding said first winding, a second electical winding surrounding said insulating tubes comprising conductor turns of rectangular cross section in side-by-side relation and having solid insulation permeable to transformer oil and being arranged in axially spaced apart layers, a plurality of insulating rings disposed at the ends of said second winding having axially extending flanges fitting between said insulating tubes, said tubes and said rings providing an insulating barrier of high dielectric strength between said first and second windings, a plurality of axially extending insulating spacers between said barrier and said conductor turns, a plurality of insulating members extending radially between said rings and said layers, the insulating members between at least certain of said layers comprising circumferentially spaced apart radial spacers attached respectively to said axial spacers and extending radially outward from said barrier between said layers and affording transformer oil access to the permeable insulation on all the conductor turns of said second winding, said layers and said end rings being rigidly held together and said conductor turns being rigidly stayed in their relative positions by a polymeric heat reactive compound bonding said conductor turns and said rings to said insulating members.

9. In stationary induction apparatus, in combination, a magnetic core having a winding leg, a first electrical winding surrounding said winding leg, a plurality of concentric insulating tubes surrounding said first winding, a second winding having a plurality of coaxial, spaced apart, coil sections each comprising a plurality of conductor turns surrounding said tubes, said conductor turns having solid insulation permeable to liquid dielectric, a plurality of insulating rings at the ends of said second winding having axially extending flanges fitting between said insulating tubes, said tubes and said rings providing an insulating barrier of high dielectric strength between said first and second windings, a plurality of axial spacing rods between said barrier and said coil sections, and a plurality of radially extending insulating members between said coil sections and insulating rings, said rings and said coil sections being rigidly held together as a unitary assembly and said conductor turns being stayed against movement by a polymeric heat reactive compound bonding said turns and said rings to said insulating members, the insulating members between certain of said coil sections comprising circumferentially separated radial spacers attached to said axial spacing rods and extending radially outward from said barrier between said coil sections and affording liquid dielectric access to the permeable insulation covering all of the conductor turns of said second winding.

References Cited in the file of this patent

UNITED STATES PATENTS

| | | |
|---|---|---|
| 1,938,421 | Gilbert | Dec. 5, 1933 |
| 2,571,418 | Castenschiold | Oct. 16, 1951 |

FOREIGN PATENTS

| | | |
|---|---|---|
| 335,557 | Great Britain | Sept. 24, 1930 |